United States Patent [19]

Sakamoto et al.

[11] Patent Number: 4,556,831
[45] Date of Patent: Dec. 3, 1985

[54] CIRCUIT ARRANGEMENT FOR ELECTRICAL TOOL WITH CLUTCH

[75] Inventors: Junshin Sakamoto; Shigeru Shinohara, both of Katsuta, Japan

[73] Assignee: Hitachi Koki Company, Limited, Tokyo, Japan

[21] Appl. No.: 629,869

[22] Filed: Jul. 11, 1984

[30] Foreign Application Priority Data

Jul. 12, 1983 [JP] Japan ................ 58-127195

[51] Int. Cl.⁴ .................. H02K 23/68; F16D 23/00
[52] U.S. Cl. .................. 318/434; 318/261; 318/375; 318/446; 318/447; 192/0.034
[58] Field of Search .......... 318/256, 261, 273, 375, 318/434, 447, 466, 470, 446; 192/0.03, 0.02 R, 0.032, 0.033, 0.034

[56] References Cited

U.S. PATENT DOCUMENTS 3,651,389 3/1972 Ito et al. ............ 318/466 X
3,875,487 4/1975 White ................ 318/447 X
4,354,147 10/1982 Klaussner ........... 318/363

FOREIGN PATENT DOCUMENTS 0788073 12/1980 U.S.S.R. .............. 318/434

Primary Examiner—William M. Shoop, Jr.
Assistant Examiner—Bentsu Ro
Attorney, Agent, or Firm—Pollock, Vande Sande & Priddy

[57] ABSTRACT

In an electrical tool having a clutch for adjusting rotational torque of the driven shaft, a limit switch of double-throw type is used for detecting the state of the clutch, and a capacitor is arranged to be charged via the limit switch. In one embodiment of the instant invention, the capacitor is normally discharged and is charged when the clutch assumes a disengaged state, thereby producing a trigger pulse used for making a short circuit for the motor only when the capacitor is not fully charged. In another embodiment, the capacitor is normally charged, and is discharged when the clutch assumes a disengaged state, thereby producing a trigger pulse used for making a short circuit for the motor. With this arrangement a switching circuit provided for making the short circuit for the motor is effectively prevented from making the short circuit when a power switch is turned on irrespective of the state of the clutch.

10 Claims, 4 Drawing Figures

CIRCUIT ARRANGEMENT FOR ELECTRICAL TOOL WITH CLUTCH

BACKGROUND OF THE INVENTION

This invention relates generally to electrical tools such as powered screw drivers, impact wrenches or the like, and more particularly to such tools having a clutch.

Conventional electrical tools used for driving screws, nuts or the like have a clutch interposed between a motor shaft and a driven shaft connected to a bit so that a desired tightening torque is obtained with the adjustment of the force of a coil spring or the like. More specifically, such a clutch is used for terminating the transmission of the rotational force from the motor through disengagement thereof when the tightening torque exceeds a predetermined value. Furthermore, a limit switch associated with the clutch is used for triggering a self-holding switching circuit so that both terminals of the motor are short-circuited for effecting dynamic braking. As a result, the motor is stopped. At the time of motor stopping, the clutch is usually put in engaged state again due to rotational inertia. However, the clutch sometimes remains in disengaged state.

When a power switch of such a conventional tool is turned on again under a condition where the clutch is disengaged, since the limit switch is in a closed state, the switching circuit operates so that dynamic braking is performed. For this reason, therefore, it has hitherto been necessary to manually rotate the driven shaft to put the clutch in an engaged state before the main switch is turned on. Such manual operation required sometimes prior to restarting the motor is troublesome, and therefore, easy-handling tools have been desired.

SUMMARY OF THE INVENTION

The present invention has been developed in order to remove the above-described drawback inherent to the conventional circuit arrangements for electrical tools with a clutch.

It is, therefore, an object of the present invention to provide a new and useful circuit arrangement for an electrical tool with a clutch so that the motor of the tool can be restarted irrespective of the state of the clutch.

According to a feature of the present invention, a limit switch of double-throw type is used and a capacitor is arranged to be charged via the limit switch. In one embodiment of the instant invention, the capacitor is normally discharged and is charged when the clutch assumes a disengaged state, thereby producing a trigger pulse used for making a short circuit for the motor, only when the capacitor is not fully charged. In another embodiment, the capacitor is normally charged, and is discharged when the clutch assumes a disengaged state, thereby producing a trigger pulse used for making a short circuit for the motor.

In accordance with the present invention, there is provided a circuit arrangement for an electrical tool with a clutch, comprising: a power switch for supplying a motor of said tool with electrical power; a limit switch responsive to said clutch which assumes first and second states for selectively transmitting power fed through said power switch; a switching circuit of self-holding type responsive to said limit switch for short-circuiting said motor when said clutch is in a predetermined state, said switching circuit being powered through said power switch; and means responsive to said limit switch for preventing said switching circuit from making a short circuit with respect to said motor, said means having a capacitor arranged to be charged through said limit switch.

In accordance with the present invention, there is also provided a circuit arrangement for an electrical tool with a clutch, comprising: a power switch of double-throw type, for assuming a first state for supplying a motor of said tool with electrical power and a second state for making a short circuit for said motor; a limit switch of double-throw type responsive to said clutch, for assuming a first state for receiving power source voltage through said power switch when said power switch is in said first state, and a second state in which said power source voltage is not received; a switching circuit of double-throw type for assuming a first state normally for supplying said motor with electrical power and a second state for short-circuiting said motor; a capacitor connected between said limit switch and said switching circuit for causing said switching circuit to assume said second state only when said limit switch is in said first state and said capacitor is in other than fully-charged state; and a discharging circuit connected to said limit switch and to said capacitor so that said capacitor is discharged when said limit switch assumes said second state.

In accordance with the present invention, there is further provided a circuit arrangement for an electrical tool with a clutch, comprising: a power switch of double-throw type, for assuming a first state for supplying a motor of said tool with electrical power and a second state for making a short circuit for said motor; a limit switch of double-throw type responsive to said clutch, for assuming a first state for receiving power source voltage through said power switch when said power switch is in said first state, and a second state in which said power source voltage is not received; a switching circuit of double-throw type for assuming a first state normally for supplying said motor with electrical power and a second state for short-circuiting said motor; and a capacitor connected between a movable contact of said limit switch and ground so as to be charged when said limit switch is in said first state, said capacitor being discharged when said limit switch assumes a second state so as to cause said switching circuit to assume said second state thereof.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
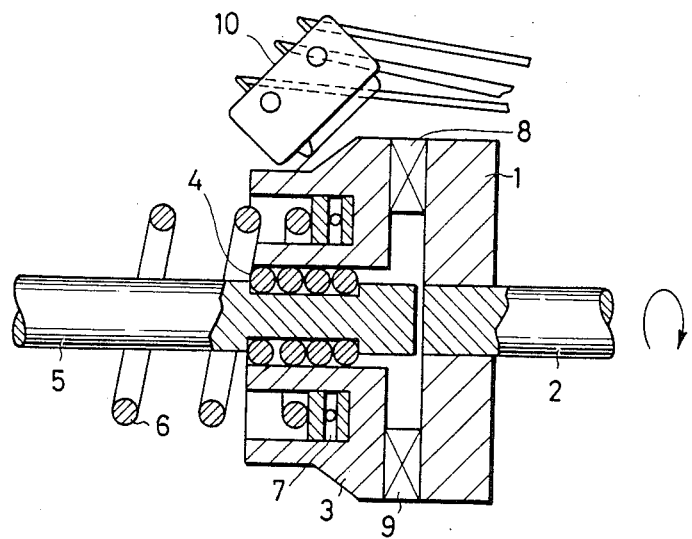
FIGS. 1 and 2 are explanatory cross-sectional views of a clutch used in electrical tools according to the present invention.
Figure 2:
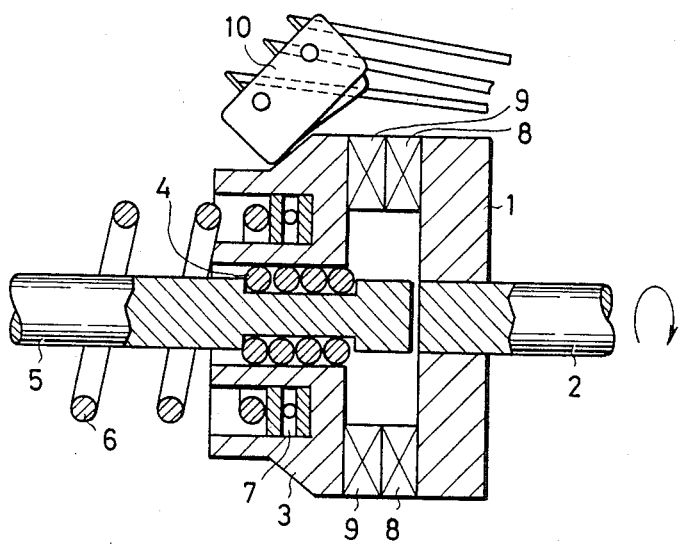

Referring now to FIGS. 1 and 2, schematic cross-sectional views around a clutch of an electrical tool, such as an electrical screw driver, are shown. FIG. 1 shows a state of driving a screw, nut or the like in a tightening direction. When a motor shaft 2 coupled with an unshown electrical motor rotates, a fixed clutch 1 secured to the motor shaft 2 also rotates. A movable clutch 3 is attached to a driven shaft 5 via ball keys 4, and is slidable in the axial direction of the driven shaft 5 and rotates together with the driven shaft 5. The movable clutch 3 is pressed toward a fixed key 8 secured to the fixed clutch 1 by way of a coil spring 6 which is attached to the movable clutch 3 via a thrust ball bearing 7. A limit switch 10 is located around the movable clutch 3 such that the limit switch 10 is operated when the movable clutch 3 moves left from the position of FIG. 1. As will be described in detail with reference to FIGS. 3 and 4 hereinafter, the limit switch 10 is of double-throw type whereas conventional limit switches are of single-throw type. The limit switch 10 has a movable contact "a" and two stationary contacts "b" and "c", and the movable contact "a" is in contact with the stationary contact "c" when the movable clutch 3 is in the position of FIG. 1. Under the condition of FIG. 1, the driving force from the motor shaft 2 is transmitted via the fixed clutch 1, the fixed keys 8, the movable keys 9 and the movable clutch 3 to the driven shaft 5, and therefore a screw driver bit or the like (not shown) attached to the left end of the driven shaft 5 is rotated for tightening the screw or the like. This state of the clutch is referred to as an engaged state.

As the screw-tightening operation is completed, load which is greater than a setting torque value defined by the pressing force of the coil spring 6, is applied to the driven shaft 5, and then the movable key 9 runs on the fixed key 8. As a result, the movable clutch 8 disengages from the fixed clutch 1, where the limit switch 10 remains in depressed state. At this time, the movable clutch 3 has been moved left against the force of the coil spring 6 causing the movable contact "a" of the limiting switch 10 to be in contact with the stationary contact "b". FIG. 2 shows such a state of termination of tightening operation, and this state of the clutch is referred to as a disengaged state.

When the operation of the electrical tool is interrupted, the clutch normally returns to the state of FIG. 1. However, the clutch remains sometimes in the disengaged state of FIG. 2 after the operation of the electrical tool has been interrupted or terminated. As described at the beginning of this specification, when the clutch remains in the condition of FIG. 2, the electrical motor cannot be restarted when a power switch is turned on again in the conventional arrangement because a conventional limit switch causes another switching circuit to establish a short-circuit for the motor. The circuit arrangement according to the present invention removes such a drawback so that the motor can be restarted whenever the power switch is turned on.

Figure 3:
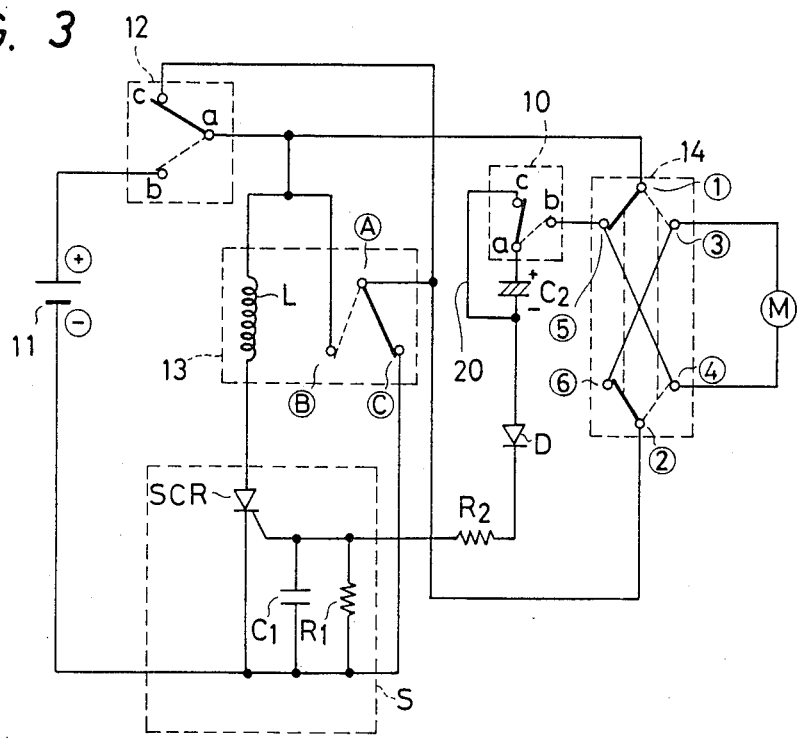
FIG. 3 is a schematic circuit diagram of an embodiment of the present invention.

Referring now to FIG. 3, a circuit diagram of an embodiment according to the present invention is shown. The circuit generally comprises a d.c. power source 11, which may be a battery or a rectifying circuit responsive to an a.c. power source, a power switch 12 of double-throw type, a limit switch 10 of double-throw type, a forward/reverse switch 14, a d.c. motor M, and a switching circuit including a relay circuit 13 and thyristor circuit S which drives the relay circuit 13. The power switch 12 comprises a movable contact "a" contactable with either a stationary contact "b" or another stationary contact "c", where the stationary contact "b" is connected to a positive terminal of the power source 11, and the movable contact "a" and the other stationary contact "c" are respectively connected to terminals of the forward/reverse switch 14. The stationary contact "c" is provided for braking the motor M through dynamic braking when the power switch 12 is turned off. The forward/reverse switch 14 is a conventional double-throw, double-pole switch for changing the polarity of supplying voltage to the motor M so that a desired rotational direction is obtained for either tightening or loosening a screw. It is assumed that when the forward/reverse switch 14 is in the state shown by solid lines, the motor M rotates in a forward direction for tightening a screw. The limit switch 10 is of the double-throw type as mentioned in the above, and a positive terminal "+" of a capacitor C2 is connected to the movable contact "a" thereof. A negative terminal "−" of the capacitor C2 is connected to the stationary contact "c" and to the anode of a diode D whose cathode is connected via a resistor R2 to the gate of a thyristor SCR of the thyristor circuit S. The thyristor circuit S also comprises a capacitor C1 and a resistor R1 connected in parallel between the gate of the thyristor SCR and ground connected to a negative terminal of the power source 11.

The relay circuit 13 comprises a solenoid L which actuates a movable contact "A" thereof on energization. The solenoid L is connected at its one terminal to the movable contact "a" of the power switch 12, and at the other terminal to the anode of the thyristor SCR. The relay has a stationary contact "B" connected to the movable contact "a" of the power switch 12, and another stationary contact "C" connected to ground. The relay circuit 13 is provided for making a short circuit for the motor M when the tightening torque exceeds a predetermined value in the same manner as in conventional circuit arrangements, and the thyristor circuit S is provided for energizing the solenoid L of the relay circuit 13. The thyristor circuit S functioning as a drive circuit for the relay circuit 13, is arranged to be triggered by a trigger pulse fed from the capacitor C2 as will be described in detail hereinafter. The capacitor C2 preferably has a value around 0.1 microfarad when the voltage of the power source 11 is 140 volts.

The circuit arrangement of FIG. 3 operates as follows. Before turning on the power switch 12, one of tightening mode and loosening mode is selected by the forward/reverse switch 14 which is manually operable. Normally, the clutch is in the state of FIG. 1 before the power switch 12 is turned on, while respective switches are in the state shown by solid lines in FIG. 3. In detail, the power switch 12 is not yet turned on so that the movable contact "a" thereof is in contact with a stationary contact "c", the movable contact "a" of the limit switch 10 is in contact with the stationary contact "b", the movable contact "A" of the relay circuit 13 is in contact with the stationary contact "C". When the power switch 12 is turned on so that the movable contact "a" is in contact with the stationary contact "b", as shown by a dotted line the motor M is energized. At this time the movable contact "A" of the relay circuit 13 is in contact with the stationary contact "C" since the solenoid L thereof has not been powered, and no trigger pulse is being applied to the gate of the thyristor SCR. During the tightening operation the clutch is in the engaged state of FIG. 1, and therefore, the movable contact "a" of the limit switch 10 is in contact with the stationary contact "c".

Assuming that the load torque, which is greater than a torque value determined by the suppressing force of the coil spring 6, is applied to the driven shaft 5 as the screw has been tightened the movable key 9 runs on the fixed key 8 as shown in FIG. 2. As a result, the fixed clutch 1 is disengaged from the movable clutch 3 and thus the limit switch 10 is actuated by the movable clutch 3 so that the movable contact, as shown by a dotted line, "a" is now in contact with the stationary contact "b" which is connected to a terminal of the motor M via the forward/reverse switch 14. Since this terminal of the motor M receives positive voltage through the power switch 12, this voltage is applied to the capacitor C2. Thus, the charging of the capacitor C2 starts since current flows via the capacitor C2, the diode D, the resistor R2 and the resistor R1 of the thyristor circuit S. With this charging operation, a positive pulse is applied to the gate of the thyristor SCR to turn on the same. As a result, the thyristor SCR is rendered conductive causing the energization of the solenoid L of the relay circuit 13. Therefore, the movable contact "A" of the relay circuit 13 is attracted toward the solenoid L so as to be in contact with the stationary contact "B". As a result, the movable contact "A" of the relay circuit 13 leaves the stationary contact "C" to cut off the power supply to the motor M. The connection between the contacts "A" and "B" of the relay circuit 13 makes a short circuit for the motor M. As a result, dynamic braking is performed to reduce the rotational speed of the motor M. Then the motor M finally stops. At this time the clutch stops during the state of FIG. 1 usually because the motor M further rotates due to inertia over a given rotational angle after application of dynamic braking. As a result, the movable contact "a" of the limit switch 10 returns to be in contact with the stationary contact "c". Accordingly, the capacitor C2 is immediately discharged via a discharging circuit 20 interposed between a negative terminal "—" of the capacitor C2 and the stationary contact "c". After the completion of screw-tightening, the power switch 12 is manually turned off and thus the movable contact "a" thereof is returned to be in contact with the stationary contact "c". Therefore, the thyristor SCR is turned off to de-energize the solenoid L of the relay circuit 13. Thus, the movable contact "A" of the relay circuit 13 returns to be in contact with the stationary contact "C" to restore its original state. As a result, all the switches are put in the initial state prior to operation.

However, the clutch sometimes stops in the state of FIG. 2 in which the movable key 9 of the movable clutch 3 runs on the fixed key 8 of the fixed clutch 1 to be put in a disengaged state. During such state, the movable contact "a" of the limit switch 10 is continuously in contact with the stationary contact "b". Even under such disengaged state of the clutch, the power switch 12 is manually turned off after the operation of the electrical tool. Therefore, the thyristor S is turned off to de-energize solenoid L of the relay circuit 13. Accordingly, the movable contact "A" of the relay circuit 13 returns to the stationary contact "C".

Under such condition, let us assume that the power switch 12 is again turned on to re-establish the connection beteen contacts "a" and "b" for performing another screw-tightening operation. At this time, although the positive voltage from the power source 11 is fed via the power switch 12 and the limit switch 10 to the capacitor C2, since the capacitor C2 has been fully charged in the former braking operation, no current can flow thereinto, and therefore, no trigger pulse is applied to the gate of the thyristor SCR. Since the solenoid L has been deenergized when the power switch 12 was turned off, the movable contact "A" of the relay circuit 13 has returned to the stationary contact "C", and the relay circuit 13 is prevented from making a short circuit for the motor M even if the power switch 12 is turned on.

In this way, the motor M starts rotating without receiving braking force. As soon as the movable clutch 3 moves back to the state of FIG. 1, the movable contact "a" of the limit switch 10 comes into contact with the stationary contact "c" so that the capacitor C2 is immediately discharged via the discharging circuit 20. As a result, the capacitor C2 is now ready for generating a trigger pulse when the clutch is put in the state of FIG. 2 in the same manner as described in the above. The diode D connected in series with the capacitor C2 is provided so that discharging of the capacitor C2 is effected by way of only the discharging circuit 20 connected between the contact "c" of the limit switch 10.

In the above description, it is assumed that the forward/reverse switch 14 has been put in a state illustrated by solid lines so that the driven shaft 5 rotates in a direction of tightening the screw. When the forward/reverse switch 14 is manipulated to be put in a state of dotted lines for causing the motor M to rotate in a direction of loosening the screw, the stationary contact "b" of the limit switch 10 receives a negative voltage. As a result, the capacitor C2 is not charged and no trigger pulse is produced. Accordingly, the thyristor circuit S is not triggered and no dynamic braking is effected in the same manner as in conventional electrical screw drivers or the like.

From the above it will be understood that the thyristor SCR receives a trigger pulse only when the capacitor C2 is not fully charged. As a result, the thyristor SCR is prevented from continuously receiving a trigger signal when the clutch is put in the disengaged state of FIG. 2.

Figure 4:
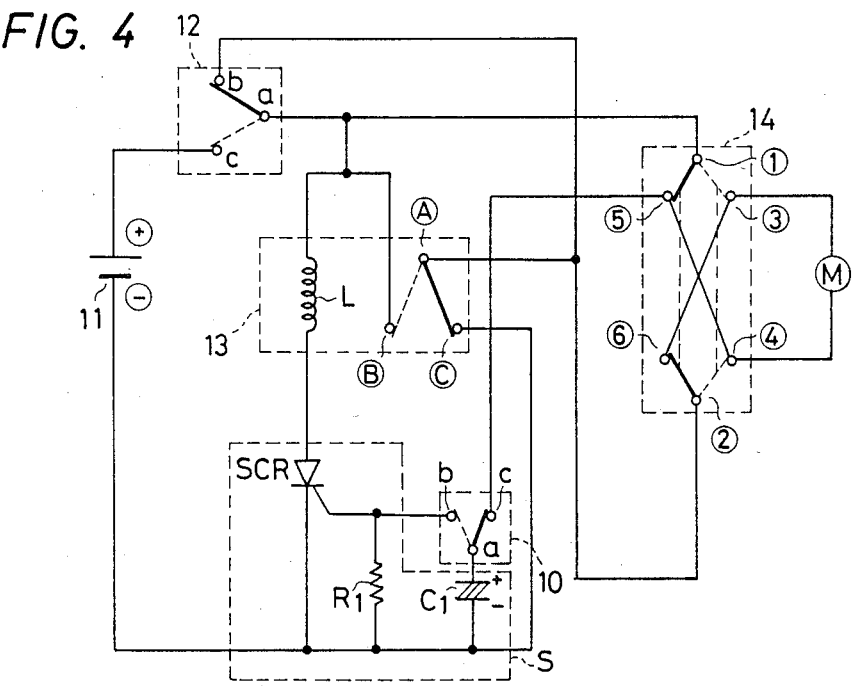
FIG. 4 is a schematic circuit diagram of another embodiment of the present invention.

FIG. 4 shows another embodiment of the present invention. This embodiment differs from the embodiment of FIG. 3 in that the limit switch 10 and the capacitor C1 are provided in a different manner. More specifically, the stationary contact "c" of the limit switch 10 is connected to one terminal of the motor M, and the other stationary contact "b" is directly connected to the gate of the thyristor SCR. Furthermore, the capacitor C1 is interposed between the movable contact "a" and ground. The capacitor C2, the discharging circuit 20, and the diode D of FIG. 3 are not used in this embodiment.

This embodiment of FIG. 4 operates as follows. When the motor M operates in the condition of FIG. 4 (see solid lines in the forward/reverse switch 14 and the limit switch 10), the capacitor C1 is charged. As the clutch is put in the disengaged state of FIG. 2, the movable contact "a" of the limit switch 10 comes into contact with the stationary contact "b", and therefore the capacitor C1 is discharged via the resistor R1. At this time a trigger pulse is applied to the gate of the thyristor SCR for turning on the same. Consequently, the solenoid L of the relay circuit 13 is energized to make a short circuit for the motor M in the same manner as in the above embodiment of FIG. 3. Assuming that the clutch remains in the disengaged state of FIG. 2, when the power switch 12 is turned on again (connection between contacts "a" and "c") after turning off the same, the thyristor SCR does not receive a trigger signal or pulse because the capacitor C1 has been fully discharged. As a result, no short circuit is made, and the motor M starts rotating without receiving braking force. Therefore, the limit switch 10 returns to the engaged state of FIG. 1, and then the capacitor C1 is again charged to be prepared for the generation of a subsequent trigger pulse.

From the foregoing description, it will be understood that the present invention provides a useful circuit arrangement for an electrical tool with a clutch where the motor can be restarted irrespective of the position of the clutch.

The above-described embodiments are just examples of the present invention, and therefore, it will be apparent for those skilled in the art that many modifications and variations may be made without departing from the spirit of the present invention.

What is claimed is:

1. A circuit arrangement for an electrical tool with a clutch, comprising:
    (a) a power switch for supplying a motor of said tool with electrical power;
    (b) a limit switch responsive to said clutch, said limit switch assuming first and second states for selectively transmitting electrical power fed through said power switch;
    (c) a switching circuit of self-holding type responsive to said limit switch for short-circulating said motor when said clutch is in a predetermined state, said switching circuit being powered through said power switch; and
    (d) means responsive to said limit switch for preventing said switching circuit from making a short circuit with respect to said motor, said means having a capacitor arranged to be charged through said limit switch.

2. A circuit arrangement as claimed in claim 1, wherein said limit switch has a movable contact connected to one terminal of said capacitor, a stationary contact connected via discharging circuit to the other terminal of said capacitor, and another stationary contact connected via said power switch to said power source.

3. A circuit arrangement as claimed in claim 2, further comprising a diode connected in series with said capacitor.

4. A circuit arrangement as claimed in claim 2, further comprising a forward/reverse switch of double-throw type connected to terminals of said motor for changing the polarity of applying voltage, said other stationary contact of said limit switch being connected via said forward/reverse switch to said power switch.

5. A circuit arrangement as claimed in claim 1, wherein said switching circuit comprises a relay circuit for making said short circuit, and a drive circuit for the relay circuit, having a thyristor responsive to a signal fed from said capacitor.

6. A circuit arrangement as claimed in claim 1, wherein said limit switch has a movable contact connected to one terminal of said capacitor, a first stationary contact connected via said power switch to said power source, and a second stationary contact connected to said switching circuit for supplying the same with a trigger signal.

7. A circuit arrangement as claimed in claim 6, further comprising a forward/reverse switch of double-throw type connected to terminals of said motor for changing the polarity of applying voltage, said first stationary contact of said limit switch being connected via said forward/reverse switch to said power switch.

8. A circuit arrangement as claimed in claim 6, wherein said switching circuit comprises a relay circuit for making said short circuit, and a drive circuit for the relay circuit, having a thyristor responsive to a signal fed from said capacitor via said limit switch.

9. A circuit arrangement for an electrical tool with a clutch, comprising:
    (a) a power switch of double-throw type, for assuming a first state for supplying a motor of said tool with electrical power and a second state for making a short circuit for said motor;
    (b) a limit switch of double-throw type responsive to said clutch, for assuming a first state for receiving power source voltage through said power switch when said power switch is in said first state, and a second state in which said power source voltage is not received;
    (c) a switching circuit of double-throw type for assuming a first state normally for supplying said motor with electrical power and a second state for short-circuiting said motor;
    (d) a capacitor connected between said limit switch and said switching circuit for causing said switching circuit to assume said second state only when said limit switch is in said first state and said capacitor is in other than fully-charged state; and
    (e) a discharging circuit connected to said limit switch and to said capacitor so that said capacitor is discharged when said limit switch assumes said second state.

10. A circuit arrangement for an electrical tool with a clutch, comprising:
    (a) a power switch of double-throw type, for assuming a first state for supplying a motor of said tool with electrical power and a second state for making a short circuit for said motor;
    (b) a limit switch of double-throw type responsive to said clutch, for assuming a first state for receiving power source voltage through said power switch when said power switch is in said first state, and a second state in which said power source voltage is not received;
    (c) a switching circuit of double-throw type for assuming a first state normally for supplying said motor with electrical power and a second state for short-circuiting said motor; and
    (d) a capacitor connected between a movable contact of said limit switch and ground so as to be charged when said limit switch is in said first state, said capacitor being discharged when said limit switch assumes a second state so as to cause said switching circuit to assume said second state thereof.

* * * * *